United States Patent [19]

Adler

[11] 4,353,212
[45] * Oct. 12, 1982

[54] CLOSED FLUID LOOP SOLAR THERMODYNAMIC SYSTEM

[76] Inventor: Harold A. Adler, 1457 Eastwind Cir., Westlake Village, Calif. 91361

[*] Notice: The portion of the term of this patent subsequent to Oct. 21, 1997, has been disclaimed.

[21] Appl. No.: 186,918

[22] Filed: Sep. 15, 1980

Related U.S. Application Data

[63] Continuation-in-part of Ser. No. 32,657, Apr. 23, 1979, Pat. No. 4,229,660.

[51] Int. Cl.³ .......................... F03G 7/02; F03G 7/06
[52] U.S. Cl. .................................. 60/622; 60/641.2; 60/641.8; 60/644.1; 60/531; 290/1 R; 290/2
[58] Field of Search ...................... 60/641.8, 531, 622, 60/644.1; 417/379; 290/1 R

[56] References Cited
U.S. PATENT DOCUMENTS

| | | | |
|---|---|---|---|
| 3,932,995 | 1/1976 | Pecar | 60/531 |
| 4,024,715 | 5/1977 | Scragg et al. | 60/641 A |
| 4,150,923 | 4/1979 | Wardman | 417/379 |
| 4,229,660 | 10/1980 | Adler | 290/2 |

*Primary Examiner*—J. V. Truhe
*Assistant Examiner*—Shelley Wade
*Attorney, Agent, or Firm*—Allan M. Shapiro

[57] ABSTRACT

Thermodynamic unit comprised of a pair of vessels which alternately raise and lower pressure in thermodynamic fluid is connected in a closed system to an engine, which utilizes the fluid in its gas phase, with the vessel raising pressure having a gas outlet connected to the engine and with exhaust therefrom being connected to the vessel lowering the fluid pressure. The vessels are alternately heated and cooled so that each alternately acts as a fluid pressure raising and lowering vessel, and each operates at the function opposite from the other vessel. Heat for the pressure raising vessel is any conventional terrestrially available heat source such as nuclear, geothermal, waste heat, electrical, solar, fossil fuel, and the like. The pressure lowering vessel delivers its heat to any conventional terrestrial sink. The gas engine is preferably a turbine, but may be another conventional gas-expanding engine. The thermodynamic fluid preferably has a change of state through the cycle, from boiling liquid, with vapor through the engine, and condensing back to liquid in the condenser. However, a gas cycle is also useful depending on the temperatures encountered by each particular system.

13 Claims, 8 Drawing Figures

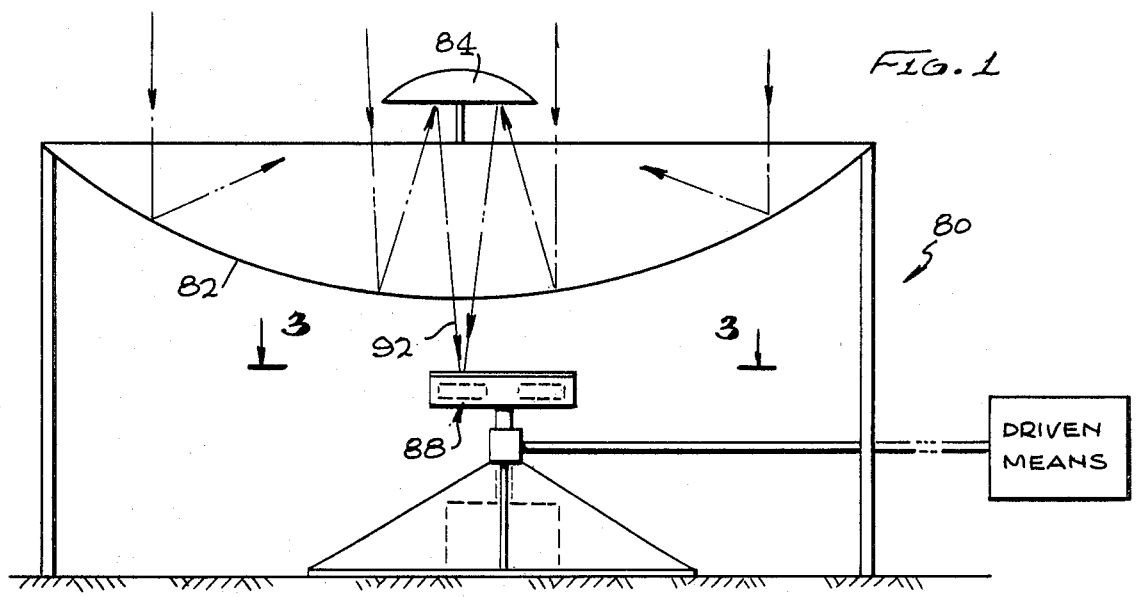
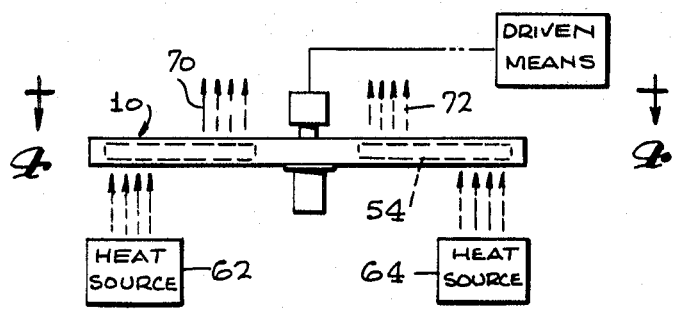
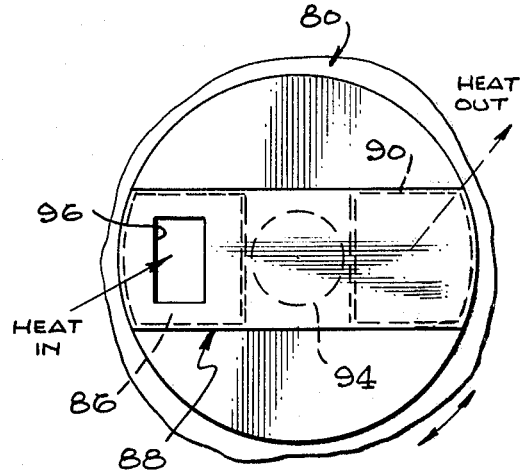
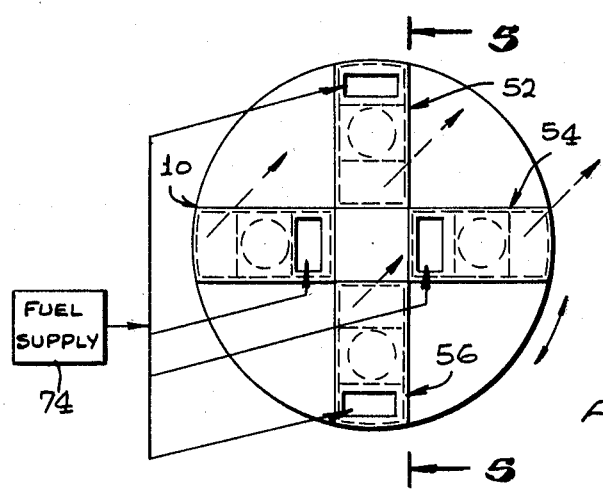
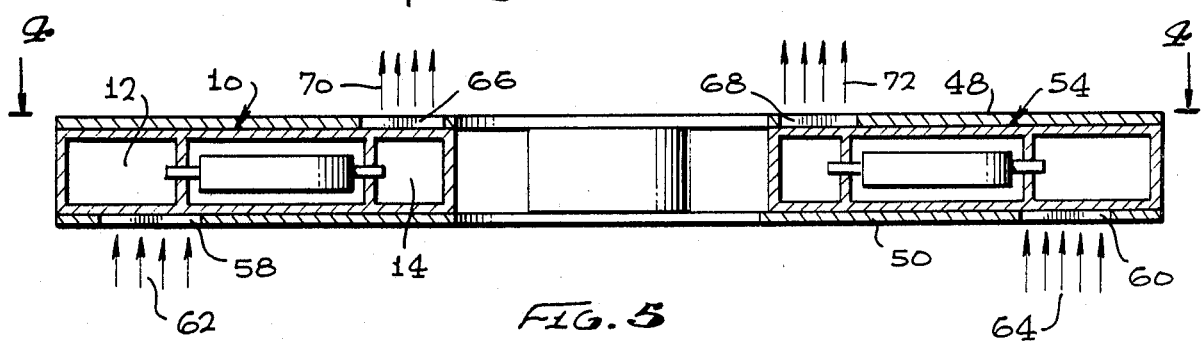

CLOSED FLUID LOOP SOLAR THERMODYNAMIC SYSTEM

CROSS-REFERENCE

This application is a continuation-in-part of patent application Ser. No. 32,657 filed on Apr. 23, 1979 for "Turbine Electric Generator With Solar Heating and Space Cooling," now U.S. Pat. No. 4,229,660.

BACKGROUND OF THE INVENTION

This invention is directed to a closed thermodynamic system wherein first and second vessels have a vapor or gas phase driven engine therebetween to form a closed system. Heating and cooling of the vessels, alternately, drives the vapor engine.

The conversion of heat to mechanical power has been accomplished in a number of different ways. Quite often, a liquid is boiled to the vapor or gas phase, and the vapor is expanded in a vapor engine to a lower pressure, and thereupon, the vapor is discharged to atmosphere, or in the more efficient system, it is condensed. Usually, the condensed liquid is pumped back to the higher pressure boiler. The thermodynamic fluid serves in its liquid and gas phases as the intermediate medium for the transfer of heat and conversion to mechanical energy. A convenient intermediate fluid is water, which usually changes in state between its liquid phase and vapor or gas phase in the process. Various different sources of heat for vaporizing the water have been employed. Fossil fuels (such as oil, gas and coal) have been widely used. In order to decrease reliance on fossil fuel-fired boilers, nuclear reactions have been employed to produce the heat for producing steam, which is then used to drive turbines. Such systems are conventionally partially closed systems with a condenser having its liquid drained therefrom by a feed pump which resupplies the liquid to the boiler. Such systems are most efficient where they can be operated in large scale, but such large systems require a large supply of water, both for cooling and for circulating system makeup.

However, there is need for a closed thermodynamic system which is capable of producing mechanical power from smaller heat sources and from waste heat sources. Such systems should be completely closed and easily controllable so that minimum maintenance is required.

SUMMARY OF THE INVENTION

In order to aid in the understanding of this invention, it can be stated in essentially summary form that it is directed to a closed thermodynamic system which includes a pair of vessels which are interconnected through a vapor engine. One of these vessels is heated to produce gas or vapor under pressure which drives the vapor engine. The engine exhaust is cooled and may be condensed in the other vessel. After most of the fluid mass is transferred through the engine, the heating and cooling input is changed so that the fluid flow is reversed for opposite direction of mass transfer.

It is, thus, an object of this invention to provide a closed thermodynamic system wherein first and second vessels are both connected to a vapor engine and are controlled so that the vessels oppositely and alternately are heated and cooled to alternately generate and condense vapor to drive the engine. It is another object to provide first and second vessels which are permanently connected (through valving, if necessary) to a turbine or other vapor engine so that, when thermodynamic fluid is heated in one of the vessels and cooled in the other, the pressure of the first is raised and the other is lowered so that the fluid passes from the heated vessel through the engine to drive the engine and the vapor is cooled and may be condensed in the cooled vessel. In the preferred embodiment, vaporizing and condensing takes place in the two vessels, respectively, and when a sufficient amount of the fluid has been transferred, the vaporizing and condensing functions are reversed for opposite mass transfer together with the driving of the engine.

The features of the present invention which are believed to be novel are set forth with particularity in the appended claims. The present invention, both as to its organization and manner of operation, together with further objects and advantages thereof, may be best understood by reference to the following description taken in conjunction with the accompanying drawings.

BRIEF DESCRIPTION OF THE DRAWINGS

FIG. 1 is a side-elevational view of a closed thermodynamic system in accordance with this invention wherein the system receives its input heat from a solar or other radiant heat source, and wherein heat rejected from the condenser is transferred to the local atmosphere.

FIG. 2 is a view of the closed thermodynamic system of this invention, wherein a local convective heat source supplies heat to the boiler.

FIG. 3 is an enlarged plan view of the closed thermodynamic system as employed with the radiant heat source of FIG. 1.

FIG. 4 is a plan view of a plurality of the closed thermodynamic systems as used with a terrestrial heat source as seen along the line 4—4 of FIG. 2, and as seen along the line 4—4 of FIG. 5.

FIG. 5 is a section through the structure of FIG. 4, with a plurality of the closed thermodynamic systems shown, as seen generally along the line 5—5 of FIG. 4.

DESCRIPTION OF THE PREFERRED EMBODIMENT

Figure 6:
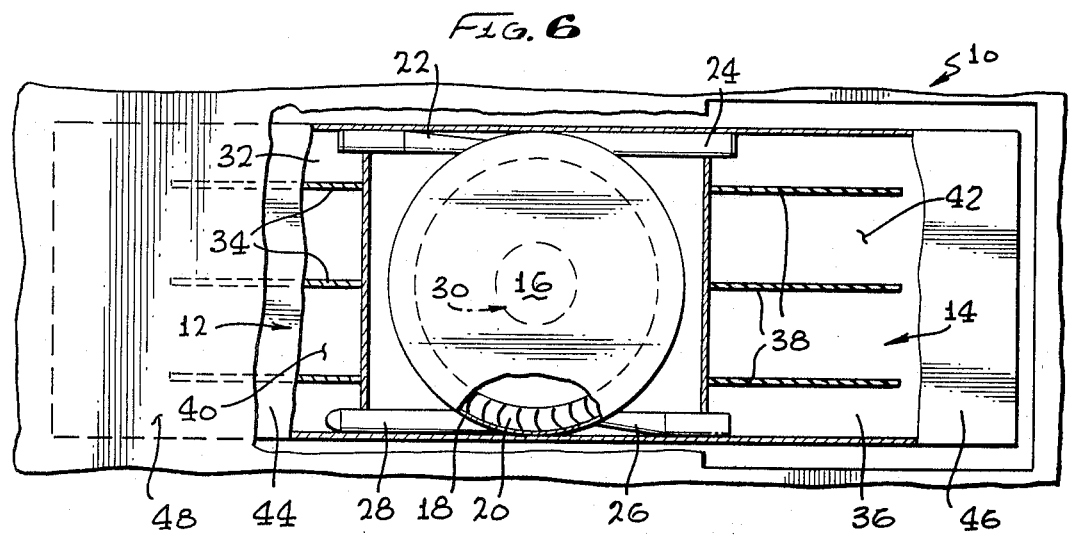
FIG. 6 is an enlarged plan view, with parts broken away, showing one of the closed thermodynamic systems of this invention.

The closed thermodynamic system 10 in FIG. 6 is illustrative of the thermodynamic systems used in particular installations. Different installations have different heat sources, different heat sinks, and different methods of controlling the admission of heat and rejection of heat from the thermodynamic system. Thermodynamic system 10 has first and second vessels 12 and 14 between which is located a turbine 16. Turbine 16 has casing 18 in which is rotatably mounted turbine wheel 20. Casing 18 has a first nozzle 22 which enters from first vessel 12 to direct fluid onto the cups or vanes on turbine wheel 20. First exhaust 24 extends from casing 18 to second vessel 14. Appropriate check valves or other valves are provided within the feed tube to nozzle 22 and within exhaust tube 24 to permit flow only in the left-to-right direction as seen in FIG. 6. Similarly, second nozzle 26 connects second vessel 14 to turbine casing 18 to direct fluid onto the cups or vanes of wheel 20. Second exhaust tube 28 is connected to exhaust turbine casing 18 to first vessel 12. Check valves or other valves are provided in the second nozzle feed and the second exhaust tube to permit fluid flow only in the right-to-left direction as seen in FIG. 6. Flow through either nozzle will turn the turbine wheel in the clockwise direction as illustrated. A device for the utilization of the rotation of the turbine wheel is connected thereto. In the present case, electric generator 30 is connected to be driven by the rotation of turbine wheel 20.

First vessel 12 is fully closed, except for exhaust tube 28 in the tube which supplies first nozzle 22. The first vessel 12 has an interior volume 32 which contains a thermodynamic fluid, and the vessel is structured so that it can be pressurized. To accomplish this, reinforcing walls 34 interconnect the top and bottom of the vessel to strengthen those vessel parts. Second vessel 14 is of similar construction and is completely enclosed except for the nozzle feed tube and exhaust tube 24. Its walls define second volume 36 for the containment of thermodynamic fluid under pressure, and walls 38 interconnect the top and bottom surfaces of the vessel 14 to strengthen them.

The bottom walls of the vessels 12 and 14 are both configured to receive heat. The walls may be finned on the outside for improved heat transfer. These bottom walls are indicated at 40 and 42, respectively, in FIG. 6. Similarly, the top walls 44 and 46 respectively of the vessels 12 and 14 are configured to reject heat, and they have fins or cooling coils or any convenient type of radiant surface for this purpose. The thermodynamic system 10 is arranged so that one of the vessels is heated, for example, vessel 12; the pressure therein rises; and the pressurized thermodynamic fluid flows from vessel 12 through nozzle 22 to rotate turbine wheel 20. The exhaust from the turbine casing is delivered to the second vessel 14 where it is cooled to maintain relatively low pressure therein. Preferably, there is a change of state so that a greater mass transfer can be accomplished for a smaller vessel size. With such a change of state, the fluid is a liquid in the first vessel and is vaporized to drive the turbine wheel, and is condensed at a lower pressure in the second vessel. When a substantial amount of the fluid is transferred, then the heating and cooling of the vessels 12 and 14 can be reversed for reverse mass transfer of the thermodynamic flow to again drive the turbine in the same direction. This effect is described in the parent patent identified in the Cross-Reference above. However, the fluid can be a gas through the entire cycle. The gas pressure can be raised in the first vessel by heating and lowered in the second vessel by cooling.

In the embodiment of FIGS. 2, 4, 5 and 6, the transfer of heat to and from the vessels is controlled by upper and lower control panels 48 and 50. These control panels are fixed and four of the thermodynamic systems 10 are radially positioned to rotate between the control panels. The four thermodynamic systems are seen in FIG. 4 where they are identified as systems 10, 52, 54 and 56. Thermodynamic systems 10 and 54 are also seen in FIG. 5. In FIG. 5, the upper and lower control panels are better seen. There are windows 58 and 60 under the radially outward vessels of systems 10 and 54, as seen in FIG. 5. There are heat sources 62 and 64 respectively under these windows so that heat is delivered to the radially outward vessels. The radially inward vessels are provided with windows 66 and 68 through the upper control panel 48 so that heat from the radially inward vessels can be delivered out of the vessels to heat sinks 70 and 72, respectively. The heat sources are supplied from fuel supply 74 illustrated in FIG. 4. Similarly, there are radially inwardly positioned windows and heat sources under the thermodynamic systems 52 and 56, and radially outward windows in the upper control panel 48 so that the corresponding radially outward vessels can deliver heat to their corresponding heat sink. While fueled heat sources are shown in FIG. 4, the heat from sources 62 and 64 in FIGS. 2 and 5 may be derived from nuclear, geothermal, electrical, solar, fossil fuel or waste heat sources. Any heating means can be employed.

The cooling means which provides the requisite heat sink can be any type, depending on the availability of particular heat sinks. Cooling by radiation, by convective cooling to the air or by heat exchange to liquid coolant are each feasible, depending on local cooling availability.

Figure 7:
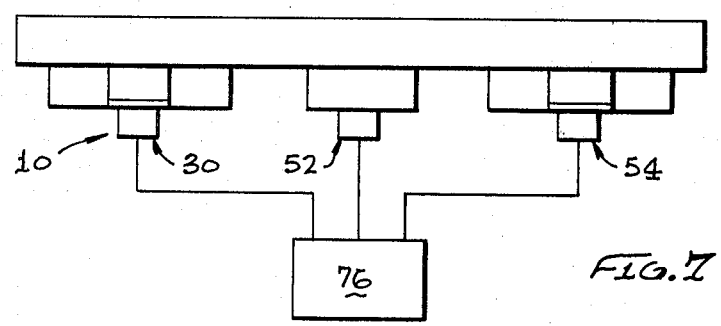
FIG. 7 is a schematic illustration of the manner in which several of the closed thermodynamic systems, such as those illustrated in FIG. 4, can deliver power to a single load.

The control panels 48 and 50 remain stationary, and at the end of a cycle when the thermodynamic fluid has been transferred in all four of the thermodynamic systems, the systems are rotated 90 degrees so that heating and cooling are reversed. In this way, each of the four thermodynamic systems is working as the systems rotate from one operative position to the next. Of course, instead of rotating the thermodynamic systems, the heat sources and heat sinks could instead be moved. As illustrated in FIG. 7, the generators connected to each of the thermodynamic systems can be connected together to a single load 76.

It is seen that the first and second vessels each alternately act as a boiler and a condenser. With these alternating functions, the main "boiler-condenser" has been condensed to a coined word "Bodens" to identify these individual vessels. The thermodynamic fluid used in the Bodens of the unit is selected in accordance with the particular temperatures involved. As previously stated, a change of state in the fluid as it passes through the cycle is preferable so that a considerable mass can be stored, boiled away, transferred through the turbine as gas or vapor, and condensed to a liquid in a smaller volume structure than if a thermodynamic fluid which is gaseous through the entire cycle is used. The selection depends principally on the temperature ranges encountered and the pressure limits desired. Water is a suitable fluid in some installations, and various fluorinated hydrocarbons and other thermodynamic fluids may be considered for particular installations.

When fuel is burned, as in the structure of FIG. 4 which incorporates a plurality of separate closed thermodynamic systems, such a plurality can be conveniently operated together. FIGS. 1 and 3 illustrate a thermal generator system 80 which incorporates the same type of thermodynamic system, but is heated by a single heat source. In the thermodynamic system 80 illustrated in FIG. 1, a pair of mirrors 82 and 84 reflect radiant heat onto a vessel 86 of a closed thermodynamic system 88. Since the thermal system 80 has only a single heat delivery point, then only a single thermodynamic system 88 need be employed to receive the heat. Thermodynamic system 88 has its first vessel 86 and in addition its second vessel 90 which can be rotated to be alternately positioned under the concentrated radiant flux 92 received from the pair of mirrors. A concentrated radiant flux may be from the sun or may be from any other suitable radiant source capable of being converted to thermal heating. Thermodynamic system 88 has a generator 94 and is the same as thermodynamic system 10. Heat sink 96 is provided for the second vessel 90 and, when the mass transfer of the thermodynamic fluid is sufficiently completed, the closed thermodynamic system 88 is rotated one-half turn so that the functions of the vessels are reversed.

Figure 8:
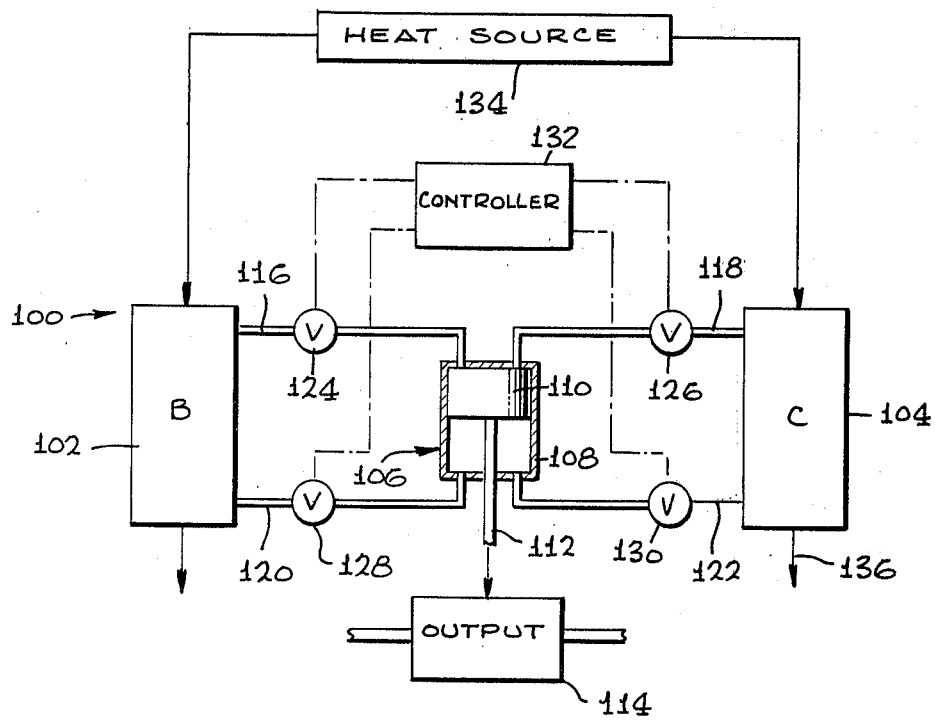
FIG. 8 is a schematic drawing of another preferred embodiment of the thermodynamic system of this invention, wherein it employs a piston engine to convert the energy in the pressurized fluid to mechanical work.

FIG. 8 illustrates another form of the closed thermodynamic system of this invention, which is generally indicated at 100. The system 100 has first and second vessels 102 and 104 which are closed vessels, except each has an inlet and an outlet, and the vessels are fitted to alternately receive and reject heat. The vessels contain a suitable thermodynamic fluid. Turbine 16 is shown in connection with vessels 12 and 14 in the system 10 illustrated in FIG. 6, but a reciprocating engine is illustrated in connection with the system 100. The reciprocating engine 106 comprises a cylinder 108 which contains piston 110 therein. Piston rod 112 is connected to the piston so that reciprocating motion of the piston in the cylinder drives an output device 114. The output device 114 can be of conventional structure, such as a crank driving an electrical generator.

Fluid tubes 116 and 118 respectively connect vessels 102 and 104 to the top volume in cylinder 108, while fluid tubes 120 and 122 respectively connect vessels 102 and 104 to the lower volume in cylinder 108 below piston 110. Valves 124, 126, 128 and 130 are respectively positioned in these fluid tubes to control fluid flow therethrough. The valves are also connected to controller 132 which controls valve cycling.

Assuming a condition where most of the thermodynamic fluid starts in vessel 102, the heat source is connected to heat the thermodynamic fluid therein to raise the pressure. Similarly, heat sink 136 cools vessel 102. Now, controller 132 is operative to alternately open fluid pressure supply valves 124 and 128 and oppositely, alternately open flow pressure exhaust valves 126 and 130. For example, to move piston 110 down, vapor pressure supply valve 124 is opened and exhaust 130 is opened. When piston 110 reaches its bottom position, those valves are closed and valves 128 and 126 are opened so that the piston is forced upwardly. This piston motion is transformed to the required form of mechanical or electrical energy. When most of the thermodynamic fluid is transferred from vessel 102 to vessel 104, heat source 134 and heat sink 136 are reversed so that vessel 104 is heated, and heat is extracted from vessel 102. Under these conditions, the mass transfer of the thermodynamic fluid is from vessel 104 to vessel 102, with reciprocation of piston 110 and consequent power output.

Each of the thermodynamic systems thus described is a closed thermodynamic system which does not require a heat pump, but which permits a 2-pressure system to operate solely by the addition and removal of heat from the alternately boiling and condensing vessels. A turbine-type device for converting the thermodynamic energy to mechanical energy and a reciprocating piston-type device for that purpose are both illustrated. It is clear that other types of such devices can also be employed to obtain mechanical energy from the thermodynamic system.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A closed thermodynamic system comprising:
    a first vessel;
    a second vessel;
    a thermodynamic engine for converting energy in a thermodynamic fluid flow stream into mechanical energy, said thermodynamic engine having a piston for reciprocation within a cylinder, and valves to control flow to and from said vessels with respect to said cylinder to reciprocate said piston, said first vessel and said second vessel each being connected only to said thermodynamic engine, a thermodynamic fluid in said vessels and in said thermodynamic engine; and
    means for first adding heat to said first vessel and removing heat from said second vessel so that the thermodynamic fluid in said first vessel is heated and raised in pressure for delivering thermodynamic fluid in gas phase under pressure through said thermodynamic engine to transfer thermodynamic fluid from said first vessel to said second vessel, and for secondly adding heat to said second vessel and removing heat from said first vessel so that fluid pressure is raised in said second vessel and lowered in said first vessel so that thermodynamic fluid in gas phase is delivered from said second vessel through said thermodynamic engine to said first vessel so that said thermodynamic engine provides output power.

2. The thermodynamic system of claim 1 wherein there is a thermodynamic fluid tube from each of said vessels to each end of said cylinder, and there is a valve in each said tube so that said piston can be reciprocated within said cylinder by alternately opening and closing said valves.

3. A closed thermodynamic system comprising:
    a first vessel;
    a second vessel;
    a thermodynamic engine for converting energy in a thermodynamic fluid flow stream into mechanical energy, said first vessel and said second vessel each being connected only to said thermodynamic engine, a thermodynamic fluid in said vessels and in said thermodynamic engine; and
    means for first adding heat to said first vessel said means for adding heat comprises a radiant energy mirror for concentrating radiant energy on said vessel to be heated, and removing heat from said second vessel so that the thermodynamic fluid in said first vessel is heated and raised in pressure for delivering thermodynamic fluid in gas phase under pressure through said thermodynamic engine to transfer thermodynamic fluid from said first vessel to said second vessel, and for secondly adding heat to said second vessel and removing heat from said first vessel so that fluid pressure is raised in said second vessel and lowered in said first vessel so that thermodynamic fluid in gas phase is delivered from said second vessel through said thermodynamic engine to said first vessel so that said thermodynamic engine provides output power.

4. The thermodynamic system of claim 3 wherein the source of radiant energy for said mirror is solar.

5. The thermodynamic system of claim 3 wherein said vessels are mounted to move with respect to said mirror so that said first and second vessels can alternately be placed with respect to said mirror to receive concentrated radiant energy therefrom.

6. A closed thermodynamic system comprising:
a first vessel;
a second vessel;
a thermodynamic engine for converting energy in a thermodynamic fluid flow stream into mechanical energy, said first vessel and said second vessel each being connected only to said thermodynamic engine, a thermodynamic fluid in said vessels and in said thermodynamic engine; and
means for first adding heat to said first vessel said means for adding heat comprises a waste heat source, and removing heat so that the thermodynamic fluid in said first vessel is heated and raised in pressure for delivering thermodynamic fluid in gas phase under pressure through said thermodynamic engine to transfer thermodynamic fluid from said first vessel to said second vessel, and for secondly adding heat to said second vessel and removing heat from said first vessel so that fluid pressure is raised in said second vessel and lowered in said first vessel so that thermodynamic fluid in gas phase is delivered from said second vessel through said thermodynamic engine to said first vessel so that said thermodynamic engine provides output power.

7. A closed thermodynamic system comprising:
a first vessel;
a second vessel;
a thermodynamic engine for converting energy in a thermodynamic fluid flow stream into mechanical energy, said first vessel and said second vessel each being connected only to said thermodynamic engine, a thermodynamic fluid in said vessels and in said thermodynamic engine; and
means for first adding heat to said first vessel said means for adding heat comprises a nuclear reaction heat source, and removing heat vessel so that the thermodynamic fluid in said first vessel is heated and raised in pressure for delivering thermodynamic fluid in gas phase under pressure through said thermodynamic engine to transfer thermodynamic fluid from said first vessel to said second vessel, and for secondly adding heat to said second vessel and removing heat from said first vessel so that fluid pressure is raised in said second vessel and lowered in said first vessel so that thermodynamic fluid in gas phase is delivered from said second vessel through said thermodynamic engine to said first vessel so that said thermodynamic engine provides output power.

8. A closed thermodynamic system comprising:
a first vessel;
a second vessel;
a thermodynamic engine for converting energy in a thermodynamic fluid flow stream into mechanical energy, said first vessel and said second vessel each being connected only to said thermodynamic engine, a thermodynamic fluid in said vessels and in said thermodynamic engine; and
means for first adding heat to said first vessel said means for adding heat comprises a geothermal heat source, and removing heat vessel so that the thermodynamic fluid in said first vessel is heated and raised in pressure for delivering thermodynamic fluid in gas phase under pressure through said thermodynamic engine to transfer thermodynamic fluid from said first vessel to said second vessel, and for secondly adding heat to said second vessel and removing heat from said first vessel so that fluid pressure is raised in said second vessel and lowered in said first vessel so that thermodynamic fluid in gas phase is delivered from said second vessel through said thermodynamic engine to said first vessel so that said thermodynamic engine provides output power.

9. A closed thermodynamic system comprising:
a first vessel;
a second vessel;
a thermodynamic engine for converting energy in a thermodynamic fluid flow stream into mechanical energy, said first vessel and said second vessel each being connected only to said thermodynamic engine, a thermodynamic fluid in said vessels and in said thermodynamic engine; and
means for first adding heat to said first vessel said means for adding heat comprises a electrical heat source, and removing heat vessel so that the thermodynamic fluid in said first vessel is heated and raised in pressure for delivering thermodynamic fluid in gas phase under pressure through said thermodynamic engine to transfer thermodynamic fluid from said first vessel to said second vessel, and for secondly adding heat to said second vessel and removing heat from said first vessel so that fluid pressure is raised in said second vessel and lowered in said first vessel so that thermodynamic fluid in gas phase is delivered from said second vessel through said thermodynamic engine to said first vessel so that said thermodynamic engine provides output power.

10. A closed thermodynamic system comprising:
a first vessel;
a second vessel;
a thermodynamic engine for converting energy in a thermodynamic fluid flow stream into mechanical energy, said first vessel and said second vessel each being connected only to said thermodynamic engine, a thermodynamic fluid in said vessels and in said thermodynamic engine; and
means for first adding heat to said first vessel said means for adding heat comprises a fossil fuel heat source, and removing heat vessel so that the thermodynamic fluid in said first vessel is heated and raised in pressure for delivering thermodynamic fluid in gas phase under pressure through said thermodynamic engine to transfer thermodynamic fluid from said first vessel to said second vessel, and for secondly adding heat to said second vessel and removing heat from said first vessel so that fluid pressure is raised in said second vessel and lowered in said first vessel so that thermodynamic fluid in gas phase is delivered from said second vessel through said thermodynamic engine to said first vessel so that said thermodynamic engine provides output power.

11. A closed thermodynamic system comprising:
a first vessel;
a second vessel;

a thermodynamic engine for converting energy in a thermodynamic fluid flow stream into mechanical energy, said first vessel and said second vessel each being connected only to said thermodynamic engine, a thermodynamic fluid in said vessels and in said thermodynamic engine;

means for first adding heat to said first vessel and removing heat vessel so that the thermodynamic fluid in said first vessel is heated and raised in pressure for delivering thermodynamic fluid in gas phase under pressure through said thermodynamic engine to transfer thermodynamic fluid from said first vessel to said second vessel, and for secondly adding heat to said second vessel and removing heat from said first vessel so that fluid pressure is raised in said second vessel and lowered in said first vessel so that thermodynamic fluid in gas phase is delivered from said second vessel through said thermodynamic engine to said first vessel so that said thermodynamic engine provides output power; and a plurality of said thermodynamic systems positioned adjacent each other and said heat source positioned to heat one of said vessels on each of said thermodynamic systems.

12. The thermodynamic system of claim 11 wherein a control panel is positioned between said heat source and said plurality of thermodynamic systems, said panel having openings therein for permitting heat to be transferred to one of said vessels in each of said systems, and said panel is movable so that, upon movement it permits heat to pass to the other vessel of each of said systems.

13. The thermodynamic system of claim 11 wherein said means for heating comprises a fuel supply and a burner, with said burner positioned so that as said thermodynamic systems are moved with respect thereto, said burner heats alternate vessels.

* * * * *